Oct. 3, 1950
F. M. WRIGHT
2,524,743
GARMENT HANGER SUPPORT
Filed April 12, 1947
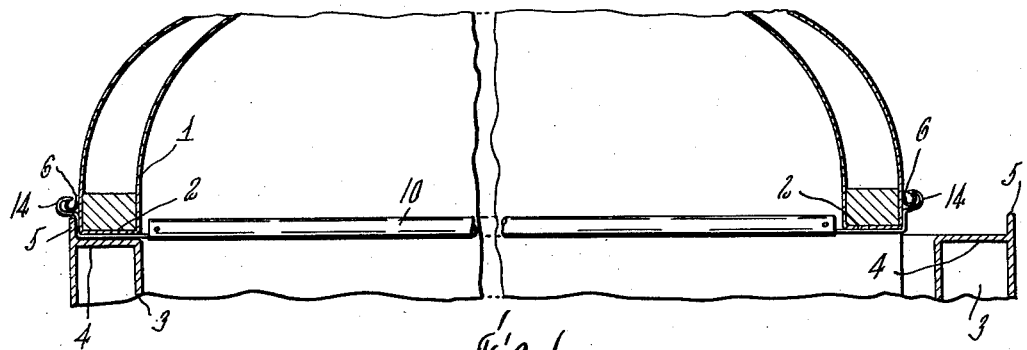
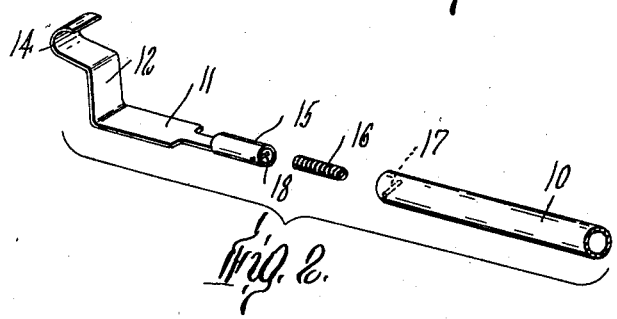
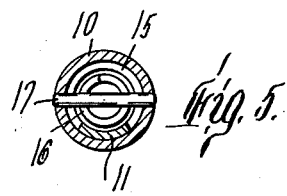
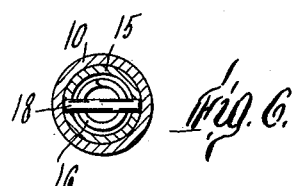
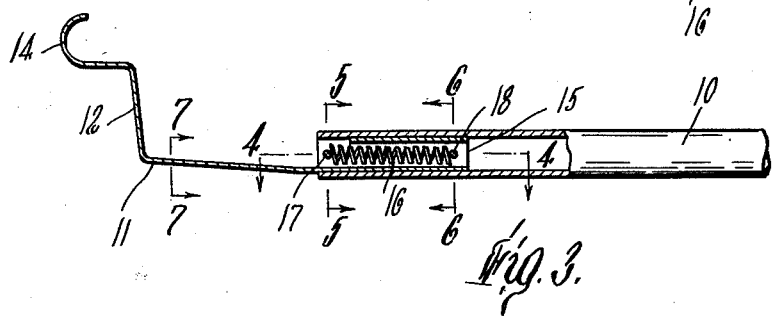
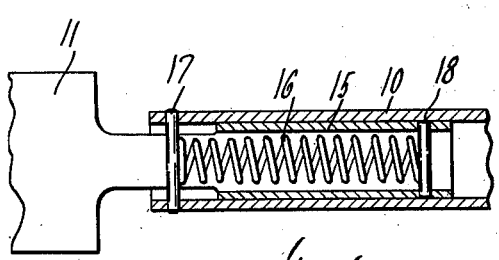
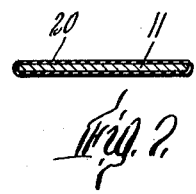
INVENTOR.
Frederick M. Wright
BY Wright Brown Quinby May
Attys.

Patented Oct. 3, 1950

2,524,743

UNITED STATES PATENT OFFICE 2,524,743

GARMENT HANGER SUPPORT

Frederick M. Wright, Milton, Mass.

Application April 12, 1947, Serial No. 741,072

7 Claims. (Cl. 224—42.1)

1

This invention relates to garment hanger supports and has for an object to provide a support adapted to be extended across the interior of an automobile or other vehicle and be carried without interference by or with the doors.

A further object is to provide such a support which when the doors are closed may be carried by the doors, but the load of which is automatically transferred from the doors to other portions of the vehicle body whenever the door is opened.

Still another object is to provide such a support which requires no fastening mechanism so that it can be removed readily from the vehicle even with a load of hangers with garments thereon, or the load may be placed as a unit in position in the vehicle.

Still another object is to provide such a support automatically adjustable to the width of the vehicle.

A further object is to provide such a support provided with means for protecting painted or other finished surfaces from damage therefrom.

The foregoing and other objects and advantages are obtained by the provision of a support capable of endwise extension and provided at opposite ends with spring metal elements of sufficient thinness to be extended between the top edges of oppositely disposed doors and the door frames and to project upwardly and hook over the drip molding of the vehicle body, these elements being rubberized or otherwise coated or surfaced to prevent rubbing on the car finish.

Referring to the accompanying drawings,

Figure 1 is a fragmentary cross section through an automobile adjacent to the tops of oppositely positioned doors and showing a support embodying the invention in position, one of the doors being slightly opened.

Figure 2 is an exploded perspective view showing one end portion of the support.

Figure 3 is a fragmentary view partly broken away and in section of an end portion of the support.

Figures 4, 5, 6 and 7 are detail sectional views on the correspondingly numbered section lines of Figure 3.

Referring to the drawings, at 1 is indicated somewhat diagrammatically the roof portion of a vehicle, such as an automobile, having at its lower edge at each side a sill 2 which forms a portion of a door frame. A pair of doors 3 are arranged to close into the door frames, each door having an upper edge portion 4 which extends beneath the door frame and slightly spaced therefrom. Such doors, also, are commonly provided

2 with extensions 5 at their outer faces which close toward engagement with the vehicle body and beneath a pair of drip moldings 6 which are carried by the vehicle body above the doors.

The drip moldings and the upper edges of the doors provide means for carrying the support of the present invention. This support comprises telescopically related sections and while these may be variously formed, they are shown as consisting of a tubular central section 10 and a pair of end sections 11. The end sections 11 are formed of thin spring metal, being sufficiently thin so that they may extend between the upper edges of the doors and the door frame so that when the doors are closed, these portions 11 are supported thereon. Outwardly of the door frames, these portions 11 are turned upwardly as at 12 to engage between the door extensions 5 and the body of the vehicle and are then outwardly and upwardly turned and provided with inturned hooked ends 14 lying outwardly of the upwardly turned portions and which may engage over and be supported upon the drip moldings 6.

As shown the inner ends of the elements 11 are rolled into tubular form as at 15, and telescope within the ends of the tubular element 10 and these elements are normally urged toward closed or telescoped relation as by springs 16. These springs react between a pair of pins 17 and 18, the pins 17 extending across and being secured to the tube 10, and the pins 18 being extended across and secured to the tubular portions 15. In order to avoid marring the finish of the vehicle, the flat elements 11 may be rubberized or otherwise coated by a protective non-rubbing surface 20 as shown in Figure 7.

Hangers for garments may be placed along the tubular element 10 and the weight of this support and its load when the vehicle doors are closed will be carried on the upper edges of the doors, but either door may be opened readily, passing out from under the corresponding spring element 11, whereupon the weight carried by this element 11 is automatically transferred to the drip molding 6 on the corresponding side of the vehicle. Of course, if desired, the support may be extended across between the windows of the vehicle, the elements 11 being extended out over the upper edges of the windows which must be lowered slightly to permit this, the outer ends of the elements 11 being hooked over the drip molding above the windows.

It will be noted that no fastening means whatever are required to secure the support in position, and that when the doors are opened, the support together with its load, may be readily removed from the vehicle or replaced as a unit.

From the foregoing description of an embodiment of this invention, it should be evident to those skilled in the art that various changes and modifications might be made therein without departing from its spirit or scope.

I claim:

1. A support of the class described, comprising an elongated element for extending across a vehicle, and a flat plate element extending outwardly from each end of said elongated element and sufficiently thin to extend between the upper edge of the vehicle door and the door casing, the outer end portion of each plate element being upwardly and outwardly turned and inwardly hooked to engage over the vehicle drip molding above the door.

2. A support of the class described, comprising an elongated element for extending across the interior of a vehicle body, and a thin plate element extending outwardly from each end of said elongated element, the outer end portion of each plate element being upwardly bent and terminating in an inwardly facing hook lying outwardly of said upwardly bent portion.

3. A support of the class described, comprising an elongated tubular element for extending across the interior of a vehicle body, a thin plate element extending outwardly from each end of said tubular element, spring means housed within said tubular element operatively connected to said plate elements and tending to draw said plate elements toward each other, each of said plate elements being sufficiently thin to extend between the upper edges of oppositely positioned vehicle doors and the door frames, the outer ends of said plate elements being upwardly turned and hooked to be engaged over and supported upon the vehicle drip molding.

4. In combination with a vehicle body having oppositely positioned doors mounted within door casings and having drip moldings above said casings, of a support comprising a plurality of telescopically related sections for extending across the interior of said body, means tending to telescope such sections, said support having end portions comprising spring sheet material of sufficient thinness to extend between the upper edges of said oppositely disposed vehicle doors and their frames, and being upwardly turned and inwardly hooked at their ends to be engaged on and be supported by the vehicle body drip molding when the vehicle door is open, said end portions supporting said support on the upper edges of said doors when said doors are closed.

5. In combination with a vehicle body having oppositely positioned doors mounted within door casings and having drip moldings above said casings, of a support extending across said body and having thin portions extending over the upper edges of said doors and within said casings and having their outer ends turned inwardly and engaged over said drip moldings.

6. In combination with a vehicle body having oppositely positioned doors mounted within door casings and having drip moldings above said casings, of an extensible and collapsible support extending across said body and having thin portions extending over the upper edges of said doors and within asid casings and having their outer ends turned inwardly and engaged over said drip moldings, and means tending to hold said support sufficiently collapsed to hold said in-turned ends above said drip moldings.

7. A support of the class described, comprising an elongated element for extending across a vehicle body, a flat plate element extending outwardly from each end of said elongated element and sufficiently thin to extend between the upper edge of the vehicle door and its casing, the outer end portion of each plate element being upwardly bent and having an inwardly facing hooked portion positioned outwardly of said upwardly bent portion for engagement over the vehicle drip molding above the vehicle door, and means tending to move said end plate elements toward each other yieldable to permit said hooked portions to be separated sufficiently to be engaged over said drip moldings and when said hooked portions are in such engagement to retain said support in position.

FREDERICK M. WRIGHT.

REFERENCES CITED

The following references are of record in the file of this patent:

UNITED STATES PATENTS

| Number | Name | Date |
| --- | --- | --- |
| 608,070 | Oliver | July 26, 1898 |
| 1,178,994 | Crump | Apr. 11, 1916 |
| 2,144,772 | Plants | Jan. 24, 1939 |
| 2,201,043 | Kirsch | May 14, 1940 |
| 2,302,300 | Davies | Nov. 17, 1942 |